Nov. 10, 1925.　　　　　　I. I. SIKORSKY　　　　　　1,560,869
FLYING MACHINE
Filed March 9, 1923
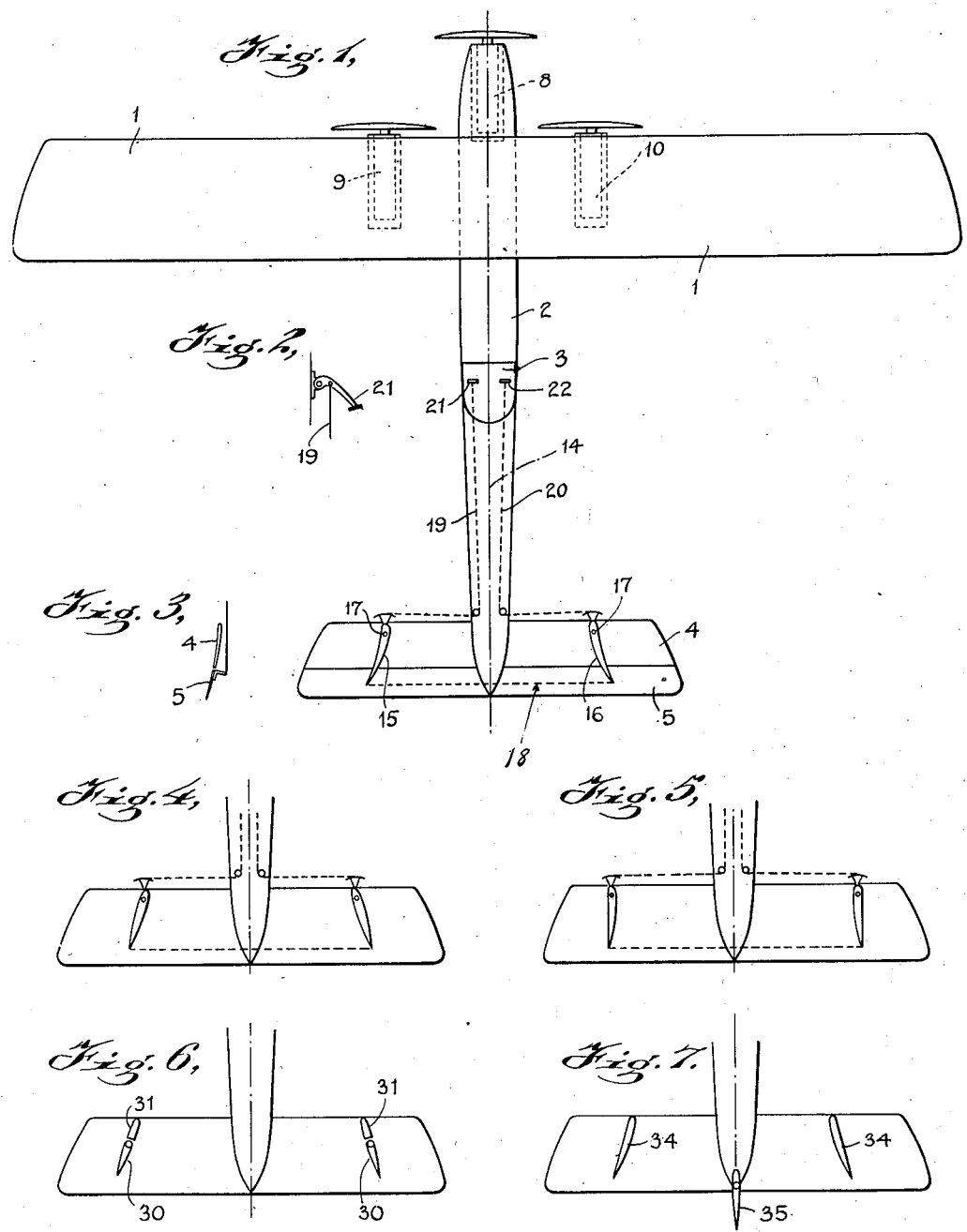

Patented Nov. 10, 1925.

1,560,869

UNITED STATES PATENT OFFICE.

IGOR I. SIKORSKY, OF NEW YORK, N. Y.

FLYING MACHINE.

Application filed March 9, 1923. Serial No. 623,854.

*To all whom it may concern:*

Be it known that I, IGOR I. SIKORSKY, a citizen of Russia, residing in New York city, New York, have invented the following described Improvements in Flying Machines.

An important advantage of a multiple motored flying machine is its ability to continue flight with one or more of the motors stopped. As is well-known, however, machines driven by a number of propellers tend to veer when one of the side propellers stops, or the motors driving the side propellers develop power unevenly so that the driving forces at the opposite sides of the machine are unbalanced. The pilot can correct this change in the direction of flight by shifting his rudders, but the liability of the machine to suddenly veer in this manner at any time during flight contains an element of danger, and furthermore, for the remainder of the flight the maneuverability of the machine is diminished and its control is more difficult since a certain degree of inclination is required of the rudders, one way or the other, to compensate for the unbalanced driving forces. This is particularly true with respect to aeroplanes.

The object of my invention is to preserve the usual stability of way, maneuverability, and ease of control under the adverse conditions of asymmetrical propeller thrusts; in other words, to eliminate or at least materially diminish the tendency of the machine to veer when the driving forces become unbalanced in the manner indicated. I accomplish this object by means of a rudder or fin system, or other system of surfaces, which is located more or less in the air streams created by the propellers, the arrangement of the system being such that the propeller-created air flows, striking the system, cause the correcting system to produce a resultant turning effort which is zero or neutral when the air flows are normal, but which tend to turn the machine in the correcting direction when the air flows are abnormal or unbalanced. Any and every unbalancing of propeller thrust is thus counteracted automatically and simultaneously with the engine or propeller failure. Various members located at various places about the machine may be used to provide the correction as will be apparent. Fixed surfaces, for example, may be used, or the usual rudders, or combinations of fixed surfaces and rudders may be employed. Preferably the correcting members or surfaces are located well back of the engine in the "slip streams" flowing back from the propellers; so located, each surface is so shaped or positioned (or both) as to produce a force directed toward the center line of the machine under the thrust of the "slip stream". A number of such arrangements are illustrated in the accompanying drawings.

The invention is not only applicable to the usual placement of multiple engines and multiple propellers, that is to say, the arrangement in which the propellers are distributed at the right and left of the center line of the machine (with which arrangement the machine tends to turn to the right or left when the driving forces are unbalanced), but it is also applicable to such other distributions of the propellers as bring some or all the propellers away from the machine center line. For example, it may be used with machines in which propellers are placed one above another; with this latter arrangement, the failure of one engine (or propeller) tends to cause the machine to rise or fall vertically or diagonally (according to the arrangement as a whole). I intend to include all such applications of the invention within the claims which follow and I intend the expression "propellers arranged at opposite sides of the machine center line" (and similar expressions), to include arrangements of the propellers above or below the horizontal plane of the machine center line as well as strictly to the right and left of the center line, except where the contrary is distinctly indicated.

The accompanying drawings illustrate various forms of my invention particularly intended for aeroplanes having their propellers placed in the manner which is common at the present time, namely, at the right and left of the center line of the machine. Fig. 1 is a diagrammatic plan view of such an aeroplane incorporating the preferred form of the invention in its rudders. Fig. 2 is a detail of one of the rudder-controlling foot levers of this machine. Fig. 3 is an elevation of the tail of the same machine and the attached elevating rudder. Figs. 4, 5, 6 and 7 illustrate other forms of the invention.

The aeroplane illustrated comprises the usual wings 1, fuselage or body 2 containing the space 3 for the pilot, and the tail 4. The elevating rudder or rudders 5 are attached to the tail in the usual manner. The details of these parts are immaterial and the machine may be a monoplane or polyplane. Three engines and propellers are shown and these are placed in the usual manner, one at the forward end of the fuselage at 8 and another at each side of the center line of the machine at 9 and 10. The propeller of each engine is attached to the end of the engine shaft, one propeller being thus located at the right of the center line 14 of the machine, one at the left and one substantially in the center line. The rudders 15 and 16 by which the machine is directed to the right or the left have been reshaped and rearranged to add the present invention to their functions, that is to say, to minimize the tendency of the machine to veer either to the right or to the left when the thrust of either of the propellers of the side engines 9 and 10 in any way become less than the thrust of the other. No means are needed to similarly correct for failure of propellers located like the propeller of engine 8 (that is to say, located in the center line 14 of the machine as stated) since failure of a propeller thus located is unaccompanied by any direct tendency of the machine to veer to the right or to the left. Failure of this engine principally reduces the total power of the machine. Each of the rudders 15 and 16 is mounted, as usual, to turn about a vertical axis 17 on the tail. In the customary manner also, the rear ends of these rudders are coupled together as at 18 and flexible lines 19 and 20 working on sectors fixed to the forward ends of the rudders connect the rudders to the pilot's foot pedals 21 and 22 respectively, so that depression of one of these foot pedals turns both rudders to the left or to the right together. In accordance with my invention, the rudders of this system 15—16 are located in the "slip streams" of those propellers that are displaced from the center line of the machine, that is to say, the rudder 15 is placed in the backward flowing air stream created by the propeller of engine 9 while the rudder 16 is similarly placed in the air stream flowing back from the propeller of engine 10. Furthermore, as shown, these rudders are so connected together by the connection 18 and are so connected to the foot pedals 21 and 22 as to be inclined to these air streams in opposite directions when in neutral position (that is to say for straight ahead flight), the rudder 15 at the left being so inclined as to tend to turn the machine to the left while the rudder 16 at the right is inclined to turn the machine to the right. The forward ends of both rudders 15 and 16 lean toward the center line of the machine therefore and each exerts a force toward the machine center line (tending to turn the machine) when the system is in neutral position. Furthermore, in this preferred form of the invention, the rudders are also of aerofoil (asymmetrical) form in cross section and have their protuberant convex surfaces facing toward the center line 14 of the machine and their flat (or concave or less convex) surfaces facing outwards. By reason of this asymmetrical form, the forces produced by the rudders and directed towards the center line of the machine are augmented as will be understood. The correcting members may, however, be symmetrical in form (stream line or not), and depend solely on their inclination to the line of air attack for their individual turning efforts (Fig. 4), or their normal or neutral position may be parallel to the line of attack, their turning efforts being secured solely by an asymmetrical form (Fig. 5). I prefer, however, regardless of whether the correcting surfaces are control rudders or not, to employ both a degree of inclination and an asymmetrical cross sectional form to secure the individual correcting turning efforts in so far as possible. Since the two rudders 15 and 16 are alike and are opposed as to their turning efforts, under normal conditions the resultant or sum of the individual turning efforts of the rudders of the system is zero or, rather, neutral. That is to say, so long as the two engines 9 and 10 are exerting equal driving efforts in straight ahead flight and hence are producing like slip streams, the turning effort of the rudder 15 under the thrust of the left-hand slip stream is exactly equal, and is opposed in direction to the turning effort of the rudder 16 under the thrust of the right-hand slip stream. The thrust of the atmosphere (in so far as it may affect the rudders) is likewise equal and opposed on the two sides of the system. When the pilot turns the rudders 15 and 16 to direct the machine to the right or to the left, the centerwards efforts of the two rudders may cease to be equal as will be apparent, but the resultant or difference between the two efforts is in such a direction as to turn the machine in the direction the pilot desires to fly. The resultant effort therefore, of the inclination and asymmetrical form of the correcting surfaces, is neutral under all normal operating conditions, that is to say, when the thrusts of the side propellers are symmetrical and balanced and in accordance with the design. When, however, one of the side engines stops, say the engine 9, or this engine fails to deliver as much power as the opposing side engine 10, then the individual turning efforts of the two rudders no longer balance but the turning effort of the rudder 16 predominates. This is due to the fact that the rudder 16 continues to be attacked by the undiminished slip stream from the engine 10 and hence continues to exert its normal turning effort toward the machine center line, but the rudder 15 is now attacked by a diminished slip stream or by the atmosphere alone if the engine 9 is entirely stopped. Under these abnormal conditions, the correcting system 15—16 exerts a resultant turning effort tending to turn the machine to the right as will be understood. This turning effort opposes the effort of the engine 10 to turn the machine to the left and accordingly the machine tends to continue to fly straight ahead (or to the right or left if the pilot has previously turned the rudders to the left or right) just as though both engines were in normal operation. Failure of the side motor 10 while the engine 9 continues its full effort causes the correcting system to exert a turning effort in the opposite direction as will be apparent. It is evident therefore that the turning effort of asymmetrical thrust of the off-center propellers driven by the engines 9 and 10, is opposed by the initial inclination and asymmetrical form which I have given the rudders 15 and 16 (the latter, further, being placed within air currents created by those propellers). It is apparent that the correction is applied automatically and simultaneously with, and is proportional to the extent of the engine failure. Maneuverability and ease of control are preserved therefore.

It will be seen from the foregoing that the underlying principles of my invention are that correcting surfaces are located within the air streams created by those propellers which exert individual efforts on the machine to turn it from the line of flight and that these correcting surfaces are so arranged or constructed (or both) as to exert turning efforts on the machine (under the thrust or attack of the air flows), which are in such directions as to oppose the turning efforts of the propeller or propellers which create the respective air-flows. Obviously the number of correcting surfaces and their location with respect to the propellers may be varied to suit particular machines. Preferably, however, they are located within the slip streams well to the rear of the propellers. It will also be understood that while two control rudders are preferably used to furnish the correcting surfaces, the correcting surfaces may be otherwise provided as before indicated. Fig. 6, illustrates a combination of control rudders 30 and fixed rudder fins 31, so arranged as to provide the correcting surfaces. In this illustration each fin and rudder combination is symmetrical in cross-section, the turning efforts being obtained solely by inclining the fins and rudders in the manner described with reference to Fig. 1. Fig. 7 illustrates another example, fins 34 being fixed to the tail and serving solely to correct for asymmetrical propeller thrust. The center rudder 35 in this figure takes no part in correcting for unbalanced propeller thrust but acts solely to direct the flight of the machine at the will of the pilot. As before mentioned, the turning efforts are preferably obtained by combining some inclination of the correcting surfaces with an asymmetrical form and the fixed fins 34 are so inclined and shaped. The invention however is not limited to the forms illustrated but it will be understood from the foregoing that still other embodiments of it may be devised.

Claims—

1. The combination with a flying machine having a number of propellers arranged at opposite sides of the machine center line, of means providing surfaces to counteract the turning effort of unbalanced thrust of said propellers, said surfaces being located within air streams normally created by said propellers and each of said surfaces exerting a turning effort on the machine which opposes the turning effort of the propeller or propellers which create the air stream within which the respective surface is located.

2. The combination with a flying machine having a number of propellers arranged at opposite sides of the machine center line, of means providing a plurality of surfaces located within air streams normally created by said propellers and producing individual forces at an angle to the center line of the machine during straight line flight, the resultant of said individual forces being neutral under normal conditions.

3. The combination with a flying machine having a number of propellers arranged at opposite sides of the machine center line, of means providing a system of correcting surfaces to oppose the turning effort of unbalanced thrust of said propellers, said surfaces being located at opposite sides of the center line of the machine and within the air streams normally created by said propellers and each individual surface being so inclined to its air stream during straight line flight, that it produces a turning effort on the machine opposing the turning effort produced by the propeller or propellers creating the air stream in which the respective surface is located.

4. The combination with a flying machine having a number of propellers arranged at opposite sides of the machine center line, of a system of correcting members located at opposite sides of the machine within air streams normally created by said propellers, each member being of such asymmetrical aerofoil form in cross-section as to produce during straight-line flight a turning effort on the machine opposing the turning effort of the propeller or propellers which create the air stream in which it is located.

5. The combination with a flying machine having a number of propellers arranged at opposite sides of the machine center line, of a system of correcting members located at opposite sides of the center line of the machine and behind the said propellers and within the slip-streams thereof, each member producing a force directed toward the said center line of the machine during straight-line flight.

6. A multi-engined flying machine having a plurality of propellers arranged at opposite sides of the center line of the machine, a system of control rudders and means for shifting said rudders at will to direct the flight of the machine, characterized by the rudders being located within the slip-streams behind said propellers and so organized that each of said rudders produces a force directed toward the machine center line during straight line flight under normal conditions and the resultant of said forces of the system being neutral under normal conditions.

7. A multi-engined flying machine having propellers arranged at the right and the left of the center line of the machine, a system of control rudders including vertical rudders to direct the flight of the machine to the right and the left, and means for shifting said vertical rudders at will to direct the flight, characterized by the said vertical rudders being located at the right and the left of the machine center line and in the slip streams behind said propellers, being of asymmetrical aerofoil form with the protuberant convex surfaces facing the machine center line, and being inclined to the slip-streams in straight line flight, with their forward ends nearer the machine center line.

In testimony whereof, I have signed this specification.

IGOR I. SIKORSKY.